United States Patent
He et al.

(10) Patent No.: US 11,696,281 B2
(45) Date of Patent: Jul. 4, 2023

(54) MULTIPLE TTI PUSCH TRANSMISSIONS IN A WIRELESS COMMUNICATION SYSTEM

(71) Applicant: Apple Inc., Cupertino, CA (US)

(72) Inventors: Hong He, Cupertino, CA (US); Dawei Zhang, Saratoga, CA (US); Haitong Sun, Irvine, CA (US); Jia Tang, San Jose, CA (US); Pengkai Zhao, San Jose, CA (US); Wei Zeng, San Diego, CA (US); Wei Zhang, Santa Clara, CA (US); Yuchul Kim, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 193 days.

(21) Appl. No.: 16/990,041

(22) Filed: Aug. 11, 2020

(65) Prior Publication Data

US 2021/0051690 A1    Feb. 18, 2021

Related U.S. Application Data

(60) Provisional application No. 62/886,902, filed on Aug. 14, 2019.

(51) Int. Cl.
*H04W 72/1268* (2023.01)
*H04L 69/06* (2022.01)
(Continued)

(52) U.S. Cl.
CPC ......... *H04W 72/1268* (2013.01); *H04L 69/06* (2013.01); *H04W 16/14* (2013.01); *H04W 72/23* (2023.01); *H04W 88/02* (2013.01)

(58) Field of Classification Search
CPC ..... H04L 69/06; H04L 1/1614; H04L 1/1822; H04L 1/1887; H04L 27/0006;
(Continued)

(56) References Cited

U.S. PATENT DOCUMENTS

2018/0159665 A1*  6/2018  Yang ............... H04L 1/1861
2018/0234968 A1*  8/2018  Sun ................. H04W 72/042
(Continued)

FOREIGN PATENT DOCUMENTS

WO    WO2020033689 A1    2/2020

OTHER PUBLICATIONS

Extended European Search Report for EP Application No. 20190950.4-1220, dated Jan. 12, 2021, 8 pages.
(Continued)

*Primary Examiner* — Benjamin H Elliott, IV
(74) *Attorney, Agent, or Firm* — Kowert, Hood, Munyon, Rankin & Goetzel, P.C.

(57) ABSTRACT

Apparatuses, systems, and methods for a user equipment device (UE) to perform multiple TTI PUSCH transmissions in a wireless communication system as well as code block groups (CBGs) based retransmissions operations. A UE may perform radio resource control (RRC) signaling with a network entity to configure a data structure that may include one or more sets of physical uplink shared channel (PUSCH) transmission configurations, where each set of PUSCH transmission configurations span multiple TTIs. The wireless device may be configured to receive, from the network entity, a downlink control information (DCI) message that may include a time domain resource assignment field (TDRA) that may indicate a set of PUSCH transmission configurations included in the data structure. The wireless device may perform PUSCH transmissions spanning multiple TTIs according to the indicated set of PUSCH transmission configurations over an unlicensed band.

20 Claims, 15 Drawing Sheets

(51) Int. Cl.
*H04W 16/14* (2009.01)
*H04W 72/23* (2023.01)
*H04W 88/02* (2009.01)

(58) Field of Classification Search
CPC ..... H04L 5/001; H04L 5/0044; H04L 5/0094; H04L 5/0053; H04L 1/1812; H04L 1/1819; H04W 72/1268; H04W 16/14; H04W 72/1289; H04W 88/02; H04W 72/0413; H04W 72/0406; H04W 72/1284; H04W 72/0446; H04W 72/1257; H04W 88/06
See application file for complete search history.

(56) References Cited

U.S. PATENT DOCUMENTS

| | | | | |
|---|---|---|---|---|
| 2019/0149365 | A1* | 5/2019 | Chatterjee | H04L 5/0044 370/329 |
| 2019/0150142 | A1* | 5/2019 | Huang | H04L 5/0094 370/336 |
| 2019/0306923 | A1* | 10/2019 | Xiong | H04L 5/0051 |
| 2019/0312713 | A1* | 10/2019 | Yang | H04L 5/0044 |
| 2019/0357291 | A1* | 11/2019 | Zhou | H04W 72/042 |
| 2019/0387546 | A1* | 12/2019 | Li | H04L 27/26025 |
| 2020/0100286 | A1* | 3/2020 | Xu | H04L 1/187 |
| 2020/0389280 | A1* | 12/2020 | Li | H04W 72/0446 |
| 2021/0051690 | A1* | 2/2021 | He | H04L 69/06 |
| 2021/0314983 | A1* | 10/2021 | Karaki | H04L 5/0044 |
| 2022/0166591 | A1* | 5/2022 | Aiba | H04L 5/0055 |
| 2022/0191839 | A1* | 6/2022 | Ying | H04L 5/0091 |

OTHER PUBLICATIONS

Qualcomm Incorporated "Enhancements to Scheduling and HARQ Operation for NR-U", 3GPP TSG RAN WG1 Meeting #97, R1-1907263, May 13-17, 2019, 12 pages.
Ericsson "HARQ and Scheduling Enhancements for NR-U", 3GPP TSG-RAN WG1 Meeting #97, R1-1907456, May 3-17, 2019, 15 pages.
Office Action for Korean Patent Application No. 10-2020-0101701; dated Jan. 13, 2023.
Huawei "Feature lead summary of HARQ enhancements for NR-U"; 3GPP TSG RAN WG1 Meeting #97 R1-1907652; Reno, USA; 22 pages; May 13, 2019.

* cited by examiner

```
PUSCH-TimeDomainResourceAllocationlist ::=   SEQUENCE {
    multiPUSCH-TimeDomainAllocationsToAddModList   SEQUENCE (SIZE (1..maxNrOfAllocations))
        OF PUSCH-TimeDomainResourceAllocation          OPTIONAL, --Need N
}
PUSCH-TimeDomainResourceAllocation::=   SEQUENCE {
    k2                      INTEGER(0..32)          OPTIONAL, --Need N
    mappingType             ENUMERATED {typeA, typeB}
    startSymbolAndLength    INTEGER (0..127)
}
```

FIG. 10A

```
PUSCH-TimeDomainAllocation::=   SEQUENCE {
    mappingType     ENUMERATED {typeA, typeB}
    length  INTEGER (1..14)
}
```

FIG. 10B

MULTIPLE TTI PUSCH TRANSMISSIONS IN A WIRELESS COMMUNICATION SYSTEM

PRIORITY DATA

This application claims benefit of priority to U.S. Provisional Application Ser. No. 62/886,902, titled "Multiple TTI PUSCH Transmissions in a Wireless Communication System", filed Aug. 14, 2019, which is hereby incorporated by reference in its entirety as though fully and completely set forth herein.

FIELD

The present application relates to wireless devices, and more particularly to apparatuses, systems, and methods for multiple TTI PUSCH transmissions in a wireless communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Long Term Evolution (LTE) has become the technology of choice for the majority of wireless network operators worldwide, providing mobile broadband data and high-speed Internet access to their subscriber base. LTE defines a number of downlink (DL) physical channels, categorized as transport or control channels, to carry information blocks received from medium access control (MAC) and higher layers. LTE also defines a number of physical layer channels for the uplink (UL).

For example, LTE defines a Physical Downlink Shared Channel (PDSCH) as a DL transport channel. The PDSCH is the main data-bearing channel allocated to users on a dynamic and opportunistic basis. The PDSCH carries data in Transport Blocks (TB) corresponding to a MAC protocol data unit (PDU), passed from the MAC layer to the physical (PHY) layer once per Transmission Time Interval (TTI). The PDSCH is also used to transmit broadcast information such as System Information Blocks (SIB) and paging messages.

As another example, LTE defines a Physical Downlink Control Channel (PDCCH) as a DL control channel that carries the resource assignment for UEs that are contained in a Downlink Control Information (DCI) message. Multiple PDCCHs can be transmitted in the same subframe using Control Channel Elements (CCE), each of which is a nine set of four resource elements known as Resource Element Groups (REG). The PDCCH employs quadrature phase-shift keying (QPSK) modulation, with four QPSK symbols mapped to each REG. Furthermore, 1, 2, 4, or 8 CCEs can be used for a UE, depending on channel conditions, to ensure sufficient robustness.

Additionally, LTE defines a Physical Uplink Shared Channel (PUSCH) as a UL channel shared by all devices (user equipment, UE) in a radio cell to transmit user data to the network. The scheduling for all UEs is under control of the LTE base station (enhanced Node B, or eNB). The eNB uses the uplink scheduling grant (DCI format 0) to inform the UE about resource block (RB) assignment, and the modulation and coding scheme to be used. PUSCH typically supports QPSK and quadrature amplitude modulation (QAM). In addition to user data, the PUSCH also carries any control information necessary to decode the information, such as transport format indicators and multiple-in multiple-out (MIMO) parameters. Control data is multiplexed with information data prior to digital Fourier transform (DFT) spreading.

A proposed next telecommunications standard moving beyond the current International Mobile Telecommunications-Advanced (IMT-Advanced) Standards is called 5th generation mobile networks or 5th generation wireless systems, or 5G for short (otherwise known as 5G-NR for 5G New Radio, also simply referred to as NR). 5G-NR proposes a higher capacity for a higher density of mobile broadband users, also supporting device-to-device, ultra-reliable, and massive machine communications, as well as lower latency and lower battery consumption, than current LTE standards. Further, the 5G-NR standard may allow for less restrictive UE scheduling as compared to current LTE standards. Consequently, efforts are being made in ongoing developments of 5G-NR to take advantage of higher throughputs possible at higher frequencies.

SUMMARY

Embodiments relate to apparatuses, systems, and methods for multiple TTI PUSCH transmissions in a wireless communication system.

In some embodiments, a wireless device, e.g., such as a user equipment device (UE), may be configured to perform radio resource control (RRC) signaling with a network entity to configure a data structure that may include one or more sets of physical uplink shared channel (PUSCH) transmission configurations, where each set of PUSCH transmission configurations span a single or multiple TTIs. The wireless device may be configured to receive, from the network entity, a downlink control information (DCI) message that may include a time domain resource assignment field (TDRA) that may indicate a set of PUSCH transmission configurations included in the data structure. The wireless device may perform PUSCH transmissions spanning a single or multiple TTIs according to the indicated set of PUSCH transmission configurations over an unlicensed band (e.g., an unlicensed frequency band). In some embodiments, each set of PUSCH transmission configurations may include one or more PUSCH transmission configurations. In some embodiments, each PUSCH transmission configuration within a set of PUSCH transmission configurations may include at least one of a start and length indicator value (SLIV), a PUSCH mapping type to be applied, and/or a slot offset K2 value.

In some embodiments, a wireless device, e.g., such as a user equipment device (UE), may be configured to perform radio resource control (RRC) signaling with a network entity to configure a maximum number of hybrid automatic repeat request (HARQ) processes with CBG-based retransmissions to be scheduled by a single multiple transmit time interval (TTI) uplink (UL) grant. The wireless device may be configured to receive a DCI message that may schedule multiple PUSCH transmissions and HARQ processes with CBG-based retransmissions across multiple TTIs and perform PUSCH transmissions and CBG-based HARQ retransmissions spanning multiple TTIs according to the schedule indicated by the DCI message.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIGS. 10A-B illustrate ASN.1 syntax for defining data structures according to some embodiments.

Figure 1A:
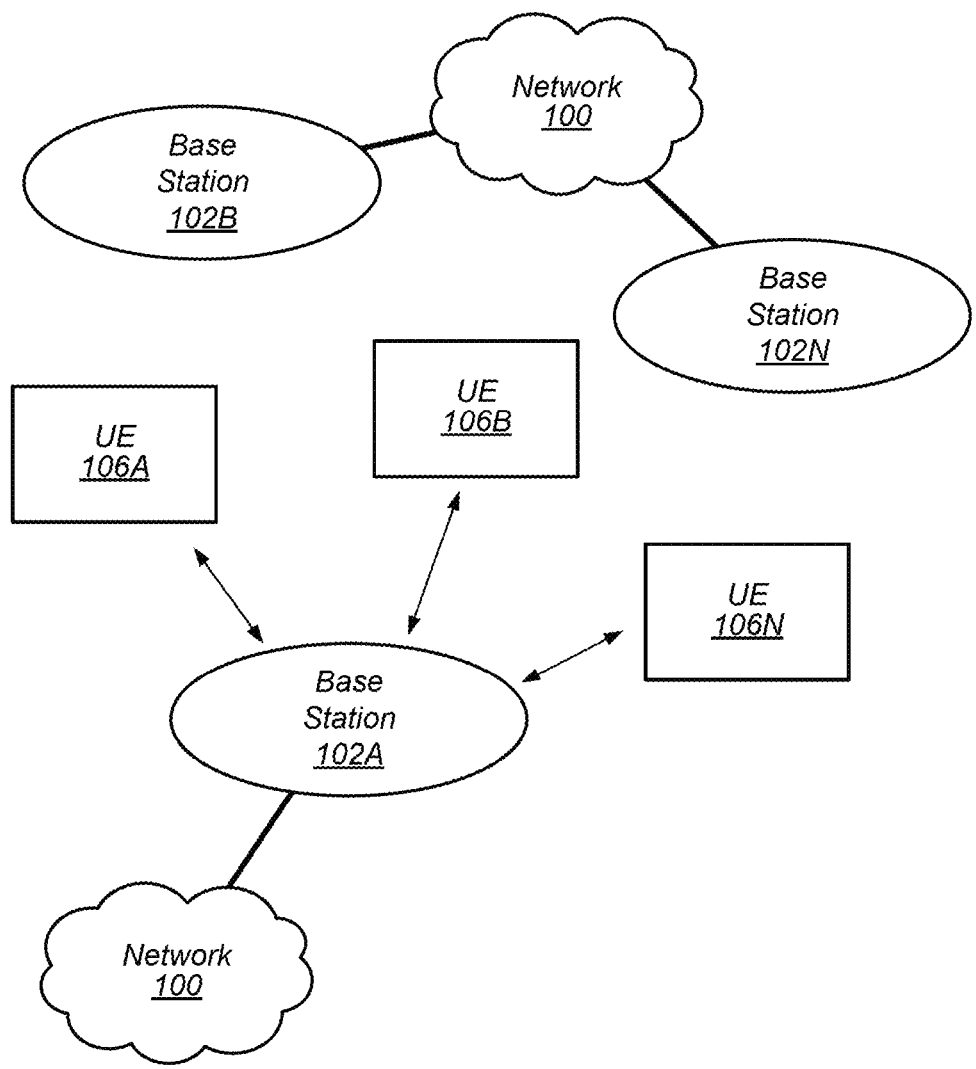
FIG. 1A illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1B:
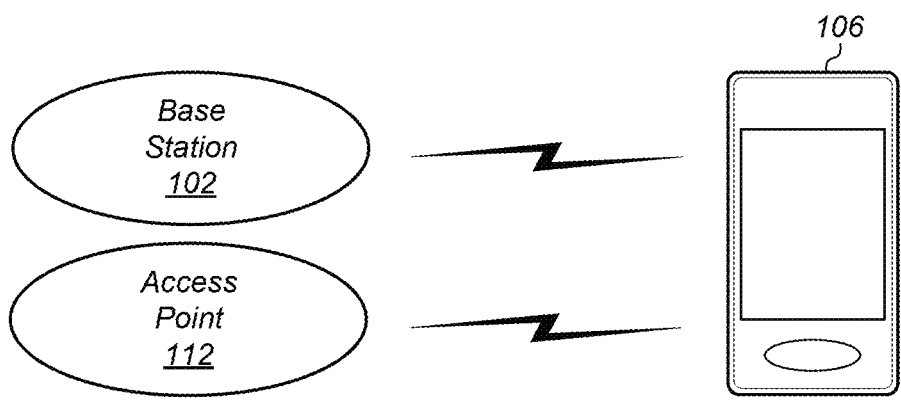
FIG. 1B illustrates an example of a base station (BS) and an access point in communication with a user equipment (UE) device according to some embodiments.

FIGS. 1A and 1B—Communication Systems

FIG. 1A illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 1B illustrates user equipment 106 (e.g., one of the devices 106A through 106N) in communication with a base station 102 and an access point 112, according to some embodiments. The UE 106 may be a device with both cellular communication capability and non-cellular communication capability (e.g., Bluetooth, Wi-Fi, and so forth) such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 2:
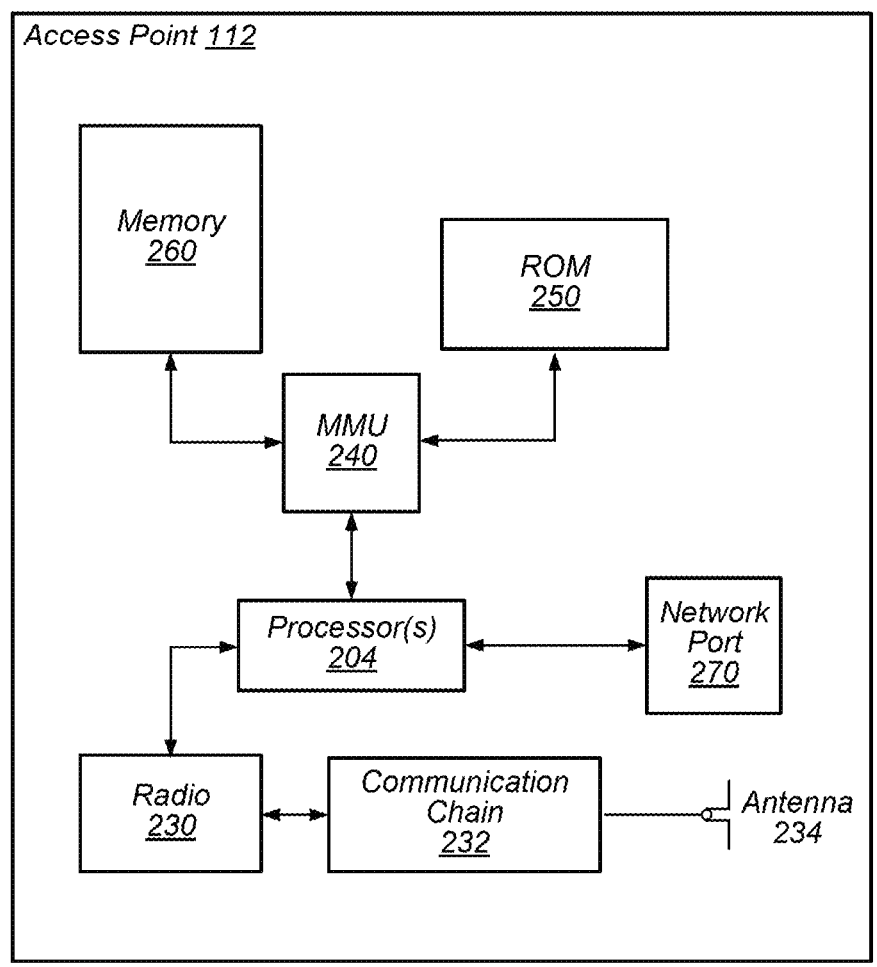
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as UEs 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with UE 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, 5G NR, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, an AP 112 may be configured to perform methods for multiple TTI PUSCH transmissions in a wireless communication system as further described herein.

Figure 3:
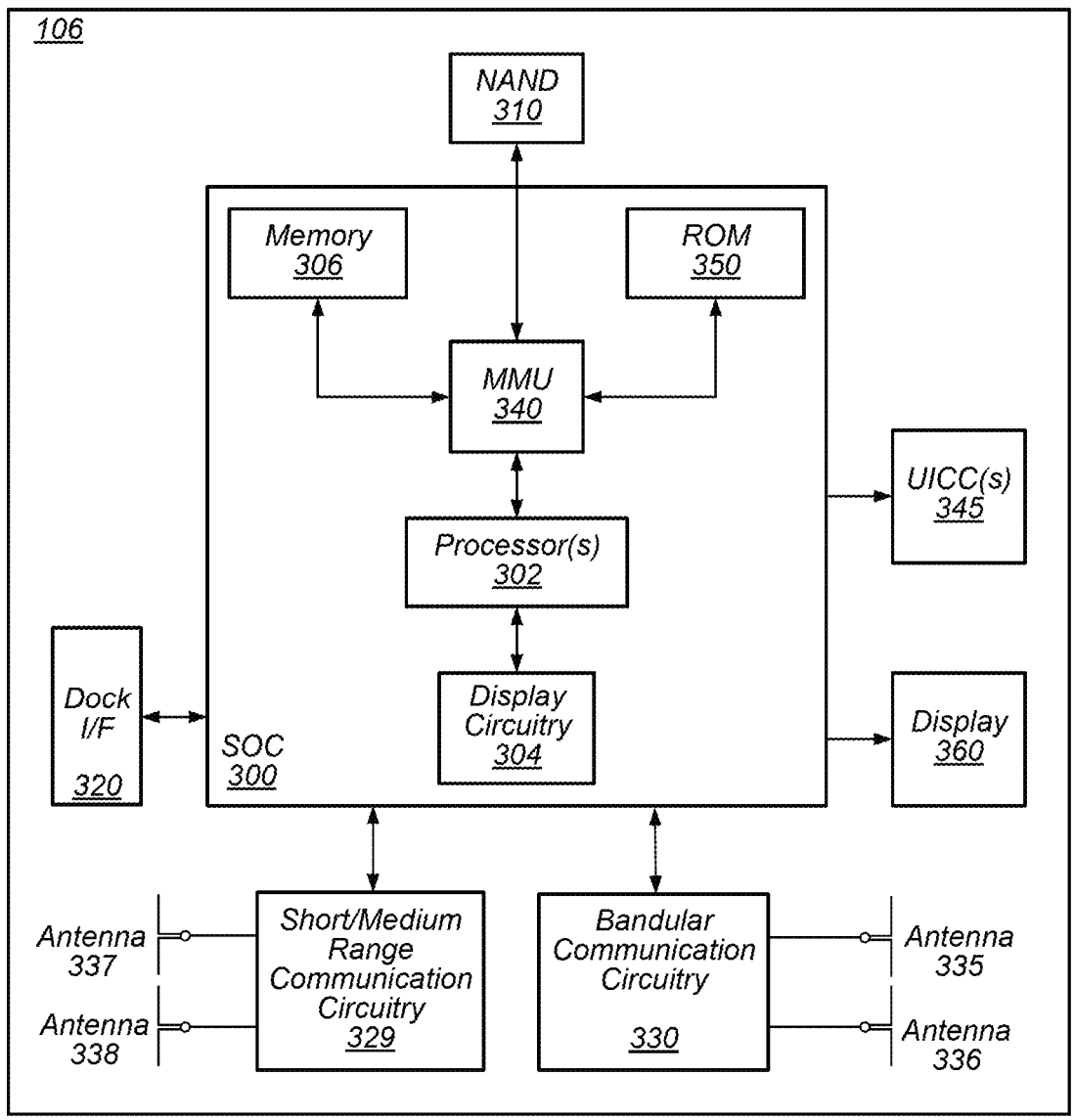
FIG. 3 illustrates an example block diagram of a UE according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly, dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short to medium range wireless communication circuitry 329, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to perform methods for multiple TTI PUSCH transmissions in a wireless communication system as further described herein.

As described herein, the communication device 106 may include hardware and software components for implementing the above features for a communication device 106 to communicate a scheduling profile for power savings to a network. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short to medium range wireless communication circuitry 329 may each include one or more processing elements. In other words, one or more processing elements may be included in cellular communication circuitry 330 and, similarly, one or more processing elements may be included in short to medium range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short to medium range wireless communication circuitry 329 may include one or more ICs that are configured to perform the functions of short to medium range wireless communication circuitry 329. In addition, each integrated circuit may include circuitry (e.g., first circuitry, second circuitry, etc.) configured to perform the functions of short to medium range wireless communication circuitry 329.

Figure 4:
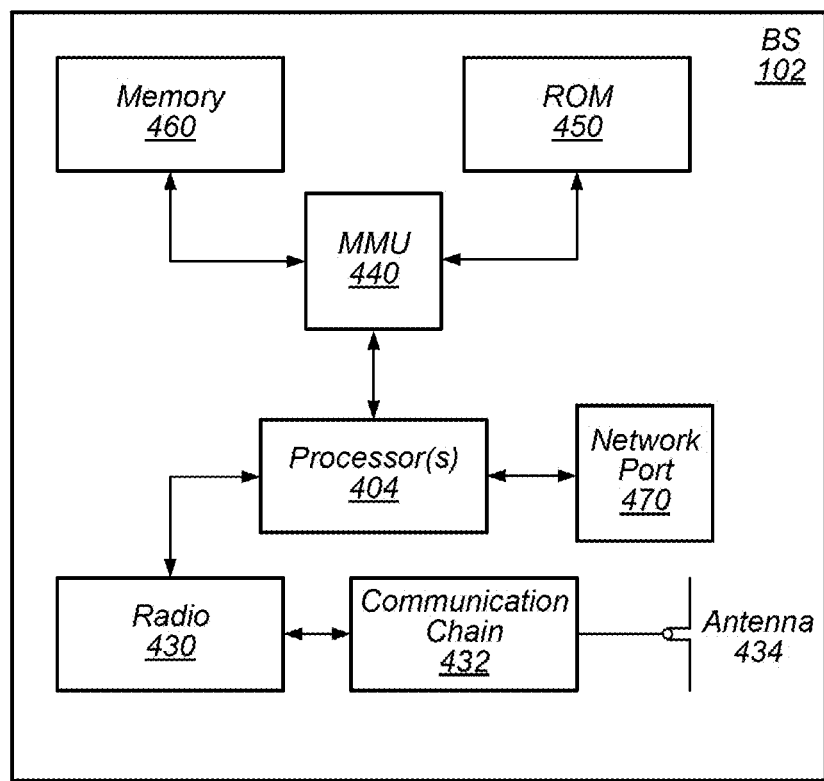
FIG. 4 illustrates an example block diagram of a BS according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNB s.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
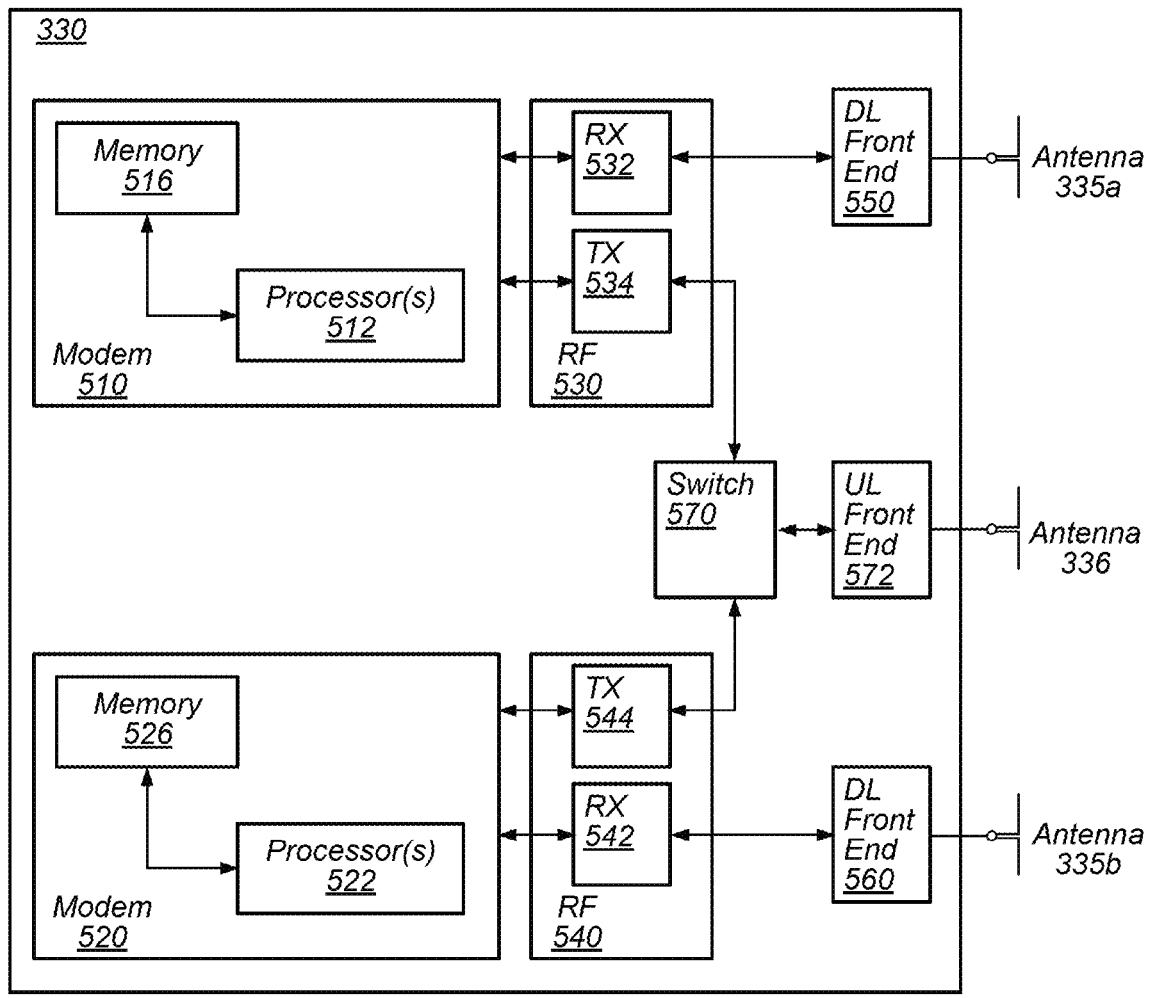
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335*a-b* and 336 as shown (in FIG. 3). In some embodiments, cellular communication circuitry 330 may include dedicated receive chains (including and/or coupled to, e.g., communicatively; directly or indirectly, dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to perform methods for multiple TTI PUSCH transmissions in a wireless communication system as further described herein.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for communicating a scheduling profile for power savings to a network, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

5G NR Architecture with LTE

Figure 6A:
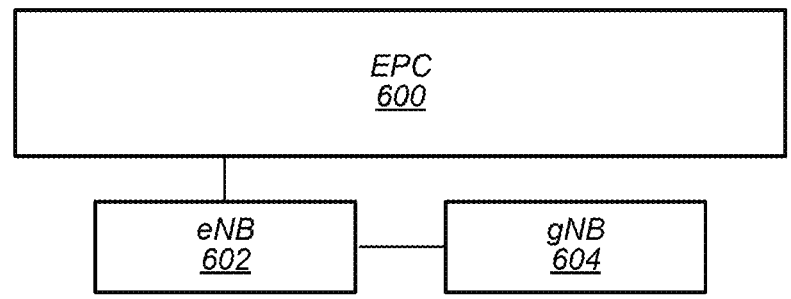
FIG. 6A illustrates an example of connections between an EPC network, an LTE base station (eNB), and a 5G NR base station (gNB).
Figure 6B:
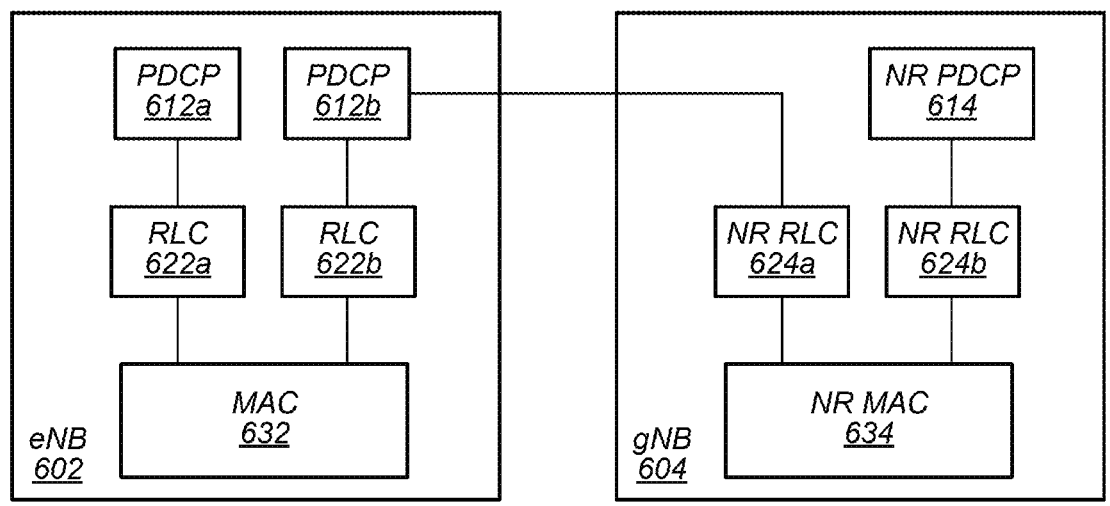
FIG. 6B illustrates an example of a protocol stack for an eNB and a gNB.

In some implementations, fifth generation (5G) wireless communication will initially be deployed concurrently with current wireless communication standards (e.g., LTE). For example, dual connectivity between LTE and 5G new radio (5G NR or NR) has been specified as part of the initial deployment of NR. Thus, as illustrated in FIGS. 6A-B, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services.

FIG. 6B illustrates a proposed protocol stack for eNB 602 and gNB 604. As shown, eNB 602 may include a medium access control (MAC) layer 632 that interfaces with radio link control (RLC) layers 622a-b. RLC layer 622a may also interface with packet data convergence protocol (PDCP) layer 612a and RLC layer 622b may interface with PDCP layer 612b. Similar to dual connectivity as specified in LTE-Advanced Release 12, PDCP layer 612a may interface via a master cell group (MCG) bearer with EPC network 600 whereas PDCP layer 612b may interface via a split bearer with EPC network 600.

Additionally, as shown, gNB 604 may include a MAC layer 634 that interfaces with RLC layers 624a-b. RLC layer 624a may interface with PDCP layer 612b of eNB 602 via an X2 interface for information exchange and/or coordination (e.g., scheduling of a UE) between eNB 602 and gNB 604. In addition, RLC layer 624b may interface with PDCP layer 614. Similar to dual connectivity as specified in LTE-Advanced Release 12, PDCP layer 614 may interface with EPC network 600 via a secondary cell group (SCG) bearer. Thus, eNB 602 may be considered a master node (MeNB) while gNB 604 may be considered a secondary node (SgNB). In some scenarios, a UE may be required to maintain a connection to both an MeNB and a SgNB. In such scenarios, the MeNB may be used to maintain a radio resource control (RRC) connection to an EPC while the SgNB may be used for capacity (e.g., additional downlink and/or uplink throughput).

5G Core Network Architecture—Interworking with Wi-Fi

Figure 7A:
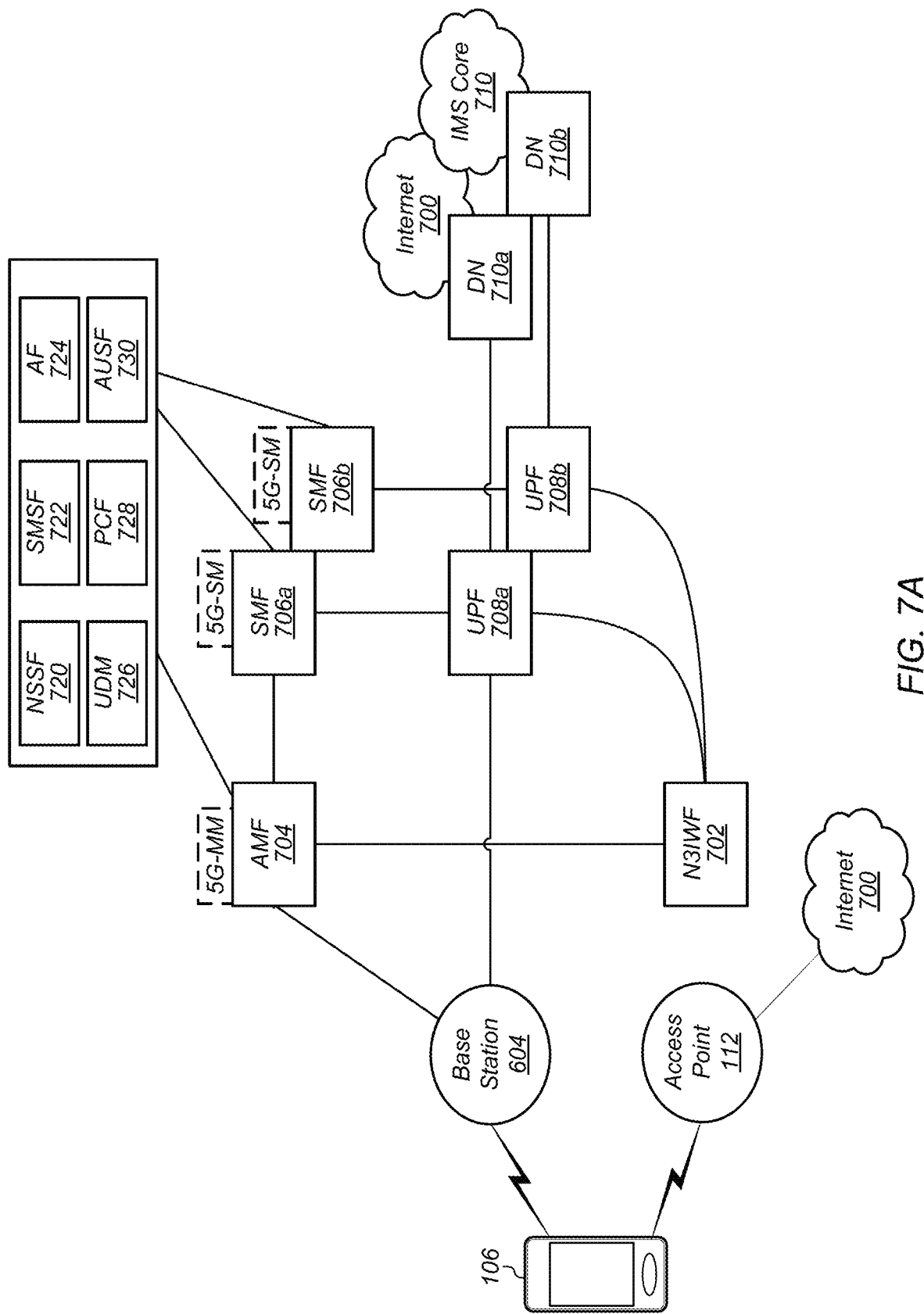
FIG. 7A illustrates an example of a 5G network architecture that incorporates both 3GPP (e.g., cellular) and non-3GPP (e.g., non-cellular) access to the 5G CN, according to some embodiments.

In some embodiments, the 5G core network (CN) may be accessed via (or through) a cellular connection/interface (e.g., via a 3GPP communication architecture/protocol) and a non-cellular connection/interface (e.g., a non-3GPP access architecture/protocol such as Wi-Fi connection). FIG. 7A illustrates an example of a 5G network architecture that incorporates both 3GPP (e.g., cellular) and non-3GPP (e.g., non-cellular) access to the 5G CN, according to some embodiments. As shown, a user equipment device (e.g., such as UE 106) may access the 5G CN through both a radio access network (RAN, e.g., such as gNB or base station 604) and an access point, such as AP 112. The AP 112 may include a connection to the Internet 700 as well as a connection to a non-3GPP inter-working function (N3IWF) 702 network entity. The N3IWF may include a connection to a core access and mobility management function (AMF) 704 of the 5G CN. The AMF 704 may include an instance of a 5G mobility management (5G MM) function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. As shown, the AMF 704 may include one or more functional entities associated with the 5G CN (e.g., network slice selection function (NSSF) 720, short message service function (SMSF) 722, application function (AF) 724, unified data management (UDM) 726, policy control function (PCF) 728, and/or authentication server function (AUSF) 730). Note that these functional entities may also be supported by a session management function (SMF) 706a and an SMF 706b of the 5G CN. The AMF 706 may be connected to (or in communication with) the SMF 706a. Further, the gNB 604 may in communication with (or connected to) a user plane function (UPF) 708a that may also be communication with the SMF 706a. Similarly, the N3IWF 702 may be communicating with a UPF 708b that may also be communicating with the SMF 706b. Both UPFs may be communicating with the data network (e.g., DN 710a and 710b) and/or the Internet 700 and IMS core network 710.

Figure 7B:
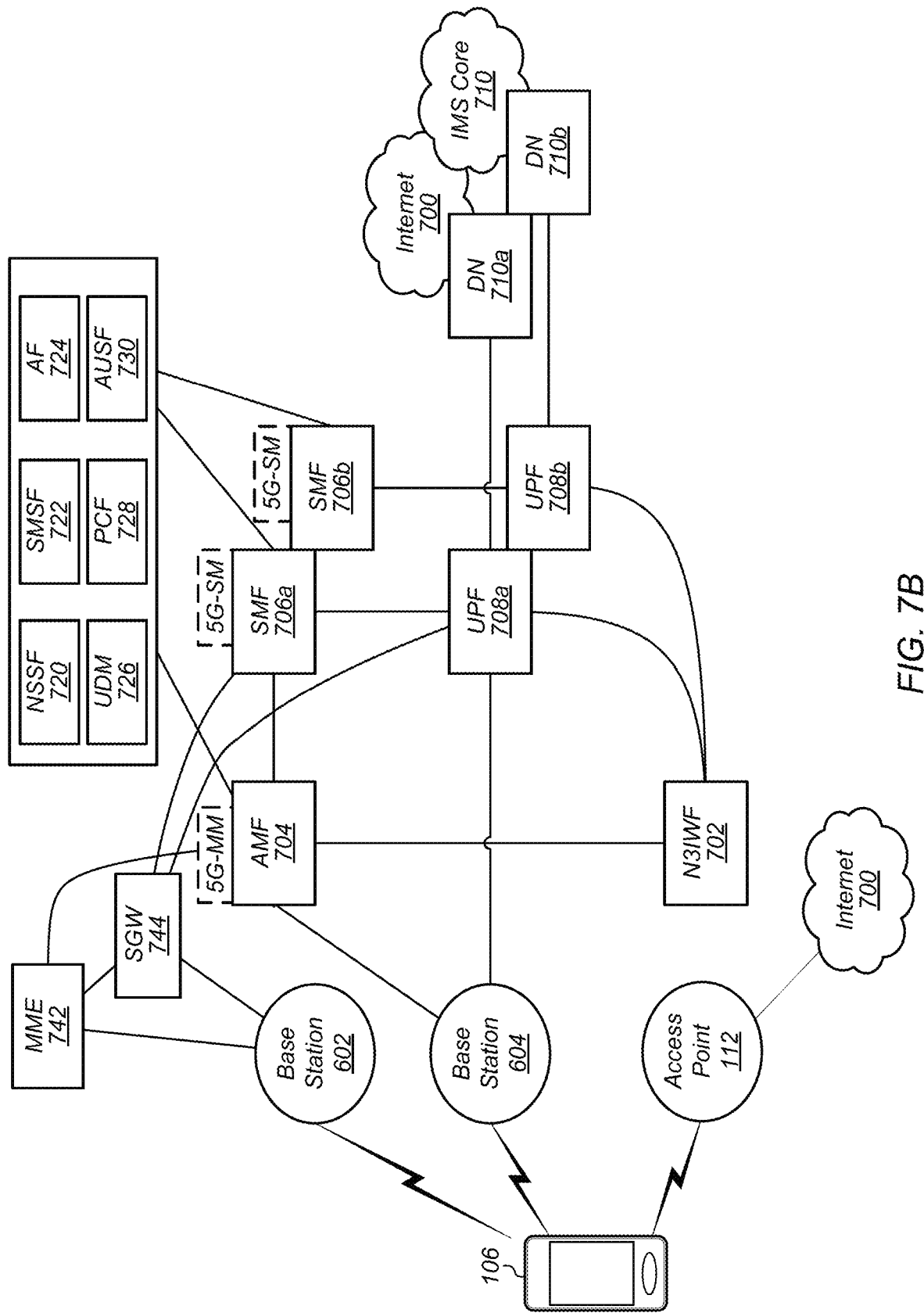
FIG. 7B illustrates an example of a 5G network architecture that incorporates both dual 3GPP (e.g., LTE and 5G NR) access and non-3GPP access to the 5G CN, according to some embodiments.

FIG. 7B illustrates an example of a 5G network architecture that incorporates both dual 3GPP (e.g., LTE and 5G NR) access and non-3GPP access to the 5G CN, according to some embodiments. As shown, a user equipment device (e.g., such as UE 106) may access the 5G CN through both a radio access network (RAN, e.g., such as gNB or base station 604 or eNB or base station 602) and an access point, such as AP 112. The AP 112 may include a connection to the Internet 700 as well as a connection to the N3IWF 702 network entity. The N3IWF may include a connection to the AMF 704 of the 5G CN. The AMF 704 may include an instance of the 5G MM function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. In addition, the 5G CN may support dual-registration of the UE on both a legacy network (e.g., LTE via base station 602) and a 5G network (e.g., via base station 604). As shown, the base station 602 may have connections to a mobility management entity (MME) 742 and a serving gateway (SGW) 744. The MME 742 may have connections to both the SGW 744 and the AMF 704. In addition, the SGW 744 may have connections to both the SMF 706a and the UPF 708a. As shown, the AMF 704 may include one or more functional entities associated with the 5G CN (e.g., NSSF 720, SMSF 722, AF 724, UDM 726, PCF 728, and/or AUSF 730). Note that UDM 726 may also include a home subscriber server (HSS) function and the PCF may also include a policy and charging rules function (PCRF). Note further that these functional entities may also be supported by the SMF 706a and the SMF 706b of the 5G CN. The AMF 706 may be connected to (or in communication with) the SMF 706a. Further, the gNB 604 may in communication with (or connected to) the UPF 708a that may also be communication with the SMF 706a. Similarly, the N3IWF 702 may be communicating with a UPF 708b that may also be communicating with the SMF 706b. Both UPFs may be communicating with the data network (e.g., DN 710a and 710b) and/or the Internet 700 and IMS core network 710.

Note that in various embodiments, one or more of the above described network entities may be configured to perform methods to improve security checks in a 5G NR network, including mechanisms for multiple TTI PUSCH transmissions in a wireless communication system, e.g., as further described herein.

Figure 8:
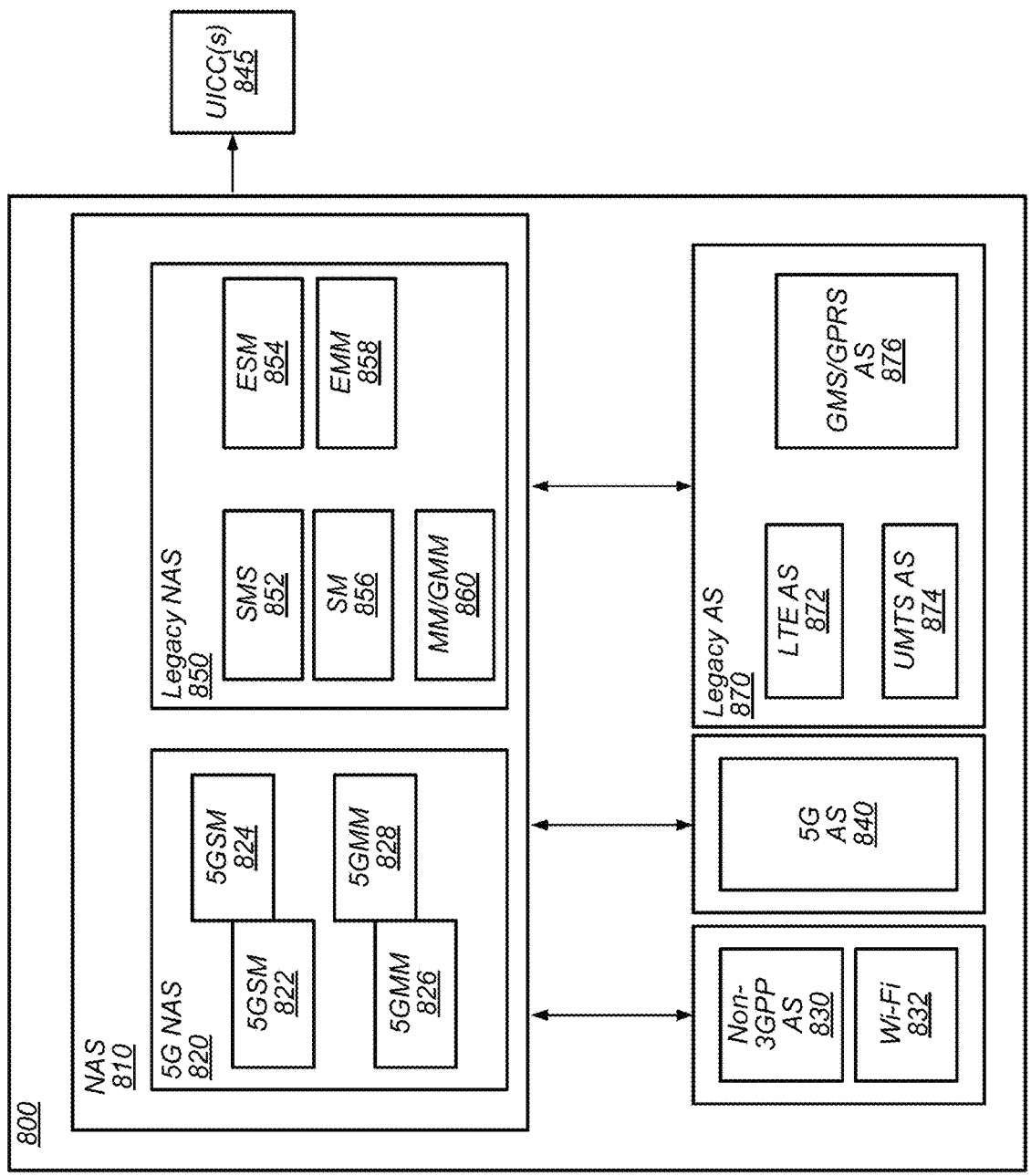
FIG. 8 illustrates an example of a baseband processor architecture for a UE, according to some embodiments.

FIG. 8 illustrates an example of a baseband processor architecture for a UE (e.g., such as UE 106), according to some embodiments. The baseband processor architecture 800 described in FIG. 8 may be implemented on one or more radios (e.g., radios 329 and/or 330 described above) or modems (e.g., modems 510 and/or 520) as described above. As shown, the non-access stratum (NAS) 810 may include a 5G NAS 820 and a legacy NAS 850. The legacy NAS 850 may include a communication connection with a legacy access stratum (AS) 870. The 5G NAS 820 may include communication connections with both a 5G AS 840 and a non-3GPP AS 830 and Wi-Fi AS 832. The 5G NAS 820 may include functional entities associated with both access stratums. Thus, the 5G NAS 820 may include multiple 5G MM entities 826 and 828 and 5G session management (SM) entities 822 and 824. The legacy NAS 850 may include functional entities such as short message service (SMS) entity 852, evolved packet system (EPS) session management (ESM) entity 854, session management (SM) entity 856, EPS mobility management (EMM) entity 858, and mobility management (MM)/GPRS mobility management (GMM) entity 860. In addition, the legacy AS 870 may include functional entities such as LTE AS 872, UMTS AS 874, and/or GSM/GPRS AS 876.

Thus, the baseband processor architecture 800 allows for a common 5G-NAS for both 5G cellular and non-cellular (e.g., non-3GPP access). Note that as shown, the 5G MM may maintain individual connection management and registration management state machines for each connection. Additionally, a device (e.g., UE 106) may register to a single PLMN (e.g., 5G CN) using 5G cellular access as well as non-cellular access. Further, it may be possible for the device to be in a connected state in one access and an idle state in another access and vice versa. Finally, there may be common 5G-MM procedures (e.g., registration, de-registration, identification, authentication, as so forth) for both accesses.

Note that in various embodiments, one or more of the above described functional entities of the 5G NAS and/or 5G AS may be configured to perform methods for multiple TTI PUSCH transmissions in a wireless communication system, e.g., as further described herein.

Multiple TTI PUSCH Transmissions

In current communication systems, certain unlicensed band, e.g. such as a 5 GHz band and/or a 6 GHz band, have communication systems deployed, e.g., such as Wi-Fi in the 5 GHz band. Thus, a 5G NR unlicensed (NR-U) band access system needs to be able to fairly co-exist with systems already deployed in the unlicensed bands. For example, an NR-U access system deployed in the 5 GHz band should enable fair coexistence with Wi-Fi access systems deployed in the 5 GHz band. Thus, a listen-before-talk (LBT) mechanism (e.g., an energy-detection-based (ED-based) channel access mechanism) may be conducted before transmissions to ensure fair coexistence with incumbent systems.

However, in current implementations of 5G NR (e.g., such as 3GPP Release 15), a downlink control information (DCI) format may only schedule a single physical uplink shared channel (PUSCH) transmission. As a consequence, scheduling multiple PUSCH transmissions over a single or multiple transmit time intervals (TTIs) may require multiple DCI message transmissions, e.g., as required for licensed band transmissions. However, although such a scheme may be a good design for licensed band access, e.g., to provide flexibility for PUSCH scheduling, it is not suitable for NR-U operation on unlicensed band because multiple DCI scheduling requests require multiple LBT procedures (e.g., an LBT procedure may be required for each DCI scheduling request) by the network (base station) to access a channel in the unlicensed band for DCI transmissions to schedule PUSCH.

This problem has been addressed by allowing support in NR-U for multi-TTI PUSCH transmissions scheduling using a single DCI format. For example, the scheduling of multiple TTIs for PUSCH transmissions, each using a separate uplink (UL) grant in the same physical downlink control channel (PDCCH) monitoring occasion will be supported in NR-U. Additionally, the scheduling of multiple TTIs for PUSCH transmissions using a single UL grant will be supported in NR-U.

Embodiments described herein provide systems, methods, and mechanisms for implementing multi-TTI scheduling in NR-U using a single DCI format. For example, embodiments described herein provide mechanisms for allocating time domain resources for multi-TTI PUSCH transmissions scheduling in NR-U. Additionally, embodiments described herein provide mechanisms for enabling code block group (CBG) based hybrid automatic repeat request (HARQ) operations for PUSCH with multi-TTI scheduling in NR-U.

In some embodiments, a UE may be scheduled to transmit transport blocks (TBs) on multiple PUSCH transmission opportunities over multiple slots and/or mini-slots using an unlicensed band via a DCI message. In some embodiments, a time domain resource assignment field (TDRA) value, m, of the DCI message (or format) may provide a row index, e.g., m+1, to a table configured by higher layer signaling, e.g., such as radio resource control (RRC) signaling. In some embodiments, each row of the RRC-configured table may contain one or more PUSCH transmission configurations (e.g., a set of PUSCH transmission configurations) and may be associated with a dedicated row index. In some embodiments, for each PUSCH transmission configuration of the one or more PUSCH transmission configurations (and/or within the set of PUSCH transmission configurations), an indexed row may define a start and length indicator value (SLIV), a PUSCH mapping type to be applied, and/or a slot offset K2 value. In some embodiments, a maximum number (or value) of PUSCH transmission configurations may be predefined and/or indicated by a UE as part of UE capability signaling. In some embodiments, the maximum number of PUSCH transmission configurations may be determined via a balancing (or tradeoff) between DCI message (or format) overhead and payload size of DCI message (or format), e.g., due to transmission-specific parameters in the DCI message (or format).

Figure 9A:
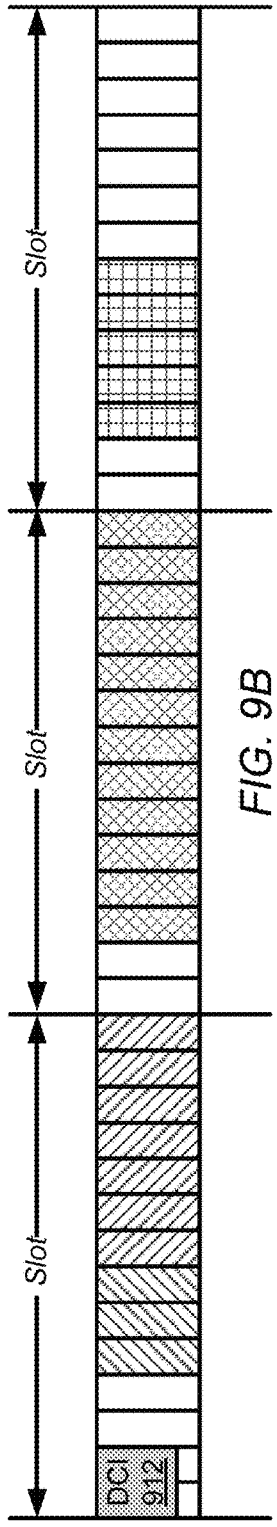
FIG. 9A illustrates an example of an RRC-configured table for a multi-slot PUSCH time domain resource allocation, according to some embodiments.
Figure 9B:
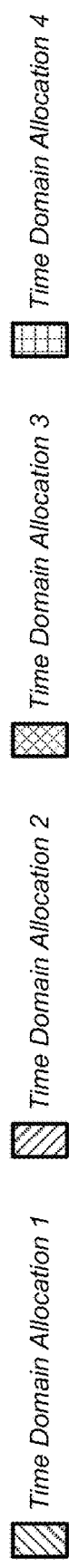
FIGS. 9B-C illustrate example time-slot allocations for the table of FIG. 9A, according to some embodiments.
Figure 9C:
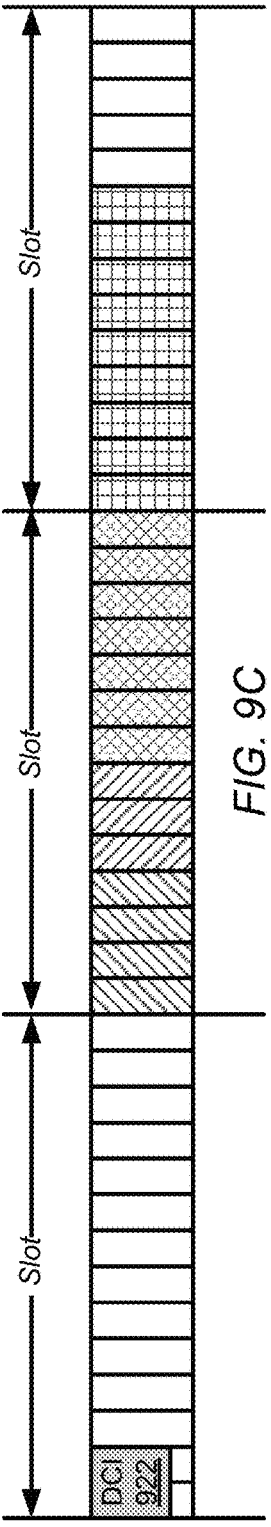

For example, FIG. 9A illustrates an example of an RRC-configured table for a multi-slot PUSCH time domain resource allocation, according to some embodiments. As shown, indexed row 0 may define (or specify) a first PUSCH transmission configuration for 4 time domain resource allocations via definition (or specification) of slot offset K2 value, a PUSCH mapping type, and a SLIV for each time domain resource allocation. Similarly, indexed row 1 may define (or specify) a first PUSCH transmission configuration for 4 time domain allocations via definition (or specification) of slot offset K2 value, a PUSCH mapping type, and a SLIV for each time domain allocation. In some embodiments, the multi-slot PUSCH time domain resource allocation may aggregate more than one single-slot PUSCH time domain resource allocation that may be used for radio transmissions, such as for an NR unlicensed band (NR-U) system. In particular, as shown if FIGS. 9B and 9C, the multi-slot PUSCH time domain resource allocation may be implemented by aggregating mixed type A (e.g., slot-based scheduling) PUSCH transmissions and type B (e.g., mini-slot-based and/or sub-slot-based scheduling) PUSCH transmissions, either with a gap (e.g. as illustrate by FIG. 9B) or without a gap in between (e.g. as illustrated by FIG. 9C). In some embodiments, such a unified framework may provide the network with scheduling flexibility to dynamically fulfil various application requirements.

In some embodiments, abstract syntax notation one (ASN.1) may be used to define a data structure for signaling a multi-slot PUSCH transmission configurations table, e.g., as illustrated by FIG. 10A. As shown, a multi-slot PUSCH transmission configuration table, such as PUSCH-TimeDomainAllocationlist may include a maximum number of allocations (maxNrOfAllocations) may be specified, as well as K2 values, PUSCH mapping type, and SLIV.

In some embodiments, multiple mini-slot (e.g., sub-slot) type UL grants may be transmitted to a UE in order to provide sufficient listen-before-talk (LBT) opportunities for the UE to reserve channels in the unlicensed band for transmissions. In some embodiments, a full-slot UL transmission, such as Index 2 of Table 11.1.1-1 of 3GPP TS 38.213 v15.6.0, may be assumed with the exception of a starting and ending slot within an UL transmission burst. In addition, in some embodiments, it may be assumed that only contiguous time-domain resource allocations without gap may be supported. Based on such assumptions, higher layer signaling may be further simplified due to the lack of need to signal a start symbol of UL transmissions except the first time-domain resource allocation. For example, as illustrated by FIG. 10B, ASN.1 may be used to define a data structure for signaling multiple mini-slot type UL grants. As shown, the data structure may be simplified to only include a PUSCH mapping type and a length.

Figure 11:
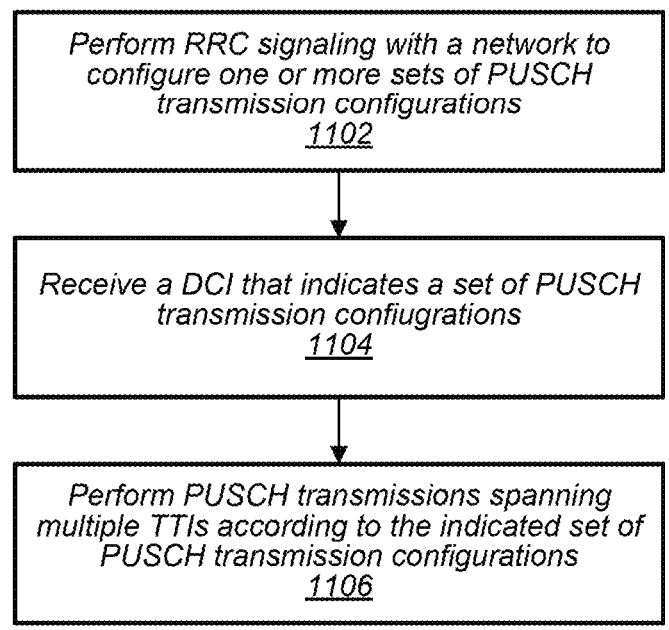
FIG. 11 illustrates a block diagram of an example of a method for scheduling a user equipment device (UE) to transmit over multiple transmit time intervals (TTIs) using an unlicensed band, according to some embodiments.

FIG. 11 illustrates a block diagram of an example of a method for scheduling a user equipment device (UE) to transmit over multiple transmit time intervals (TTIs) using an unlicensed band, according to some embodiments. The method shown in FIG. 11 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1102, a UE, such as UE 106, may perform radio resource control (RRC) signaling with a network entity, such as gNB 604, to configure a data structure that may include one or more sets of physical uplink shared channel (PUSCH) transmission configurations. In some embodiments each set of PUSCH transmission configurations may span multiple TTIs. In some embodiments, each set of PUSCH transmission configurations may include one or more PUSCH transmission configurations. In some embodiments, each PUSCH transmission configuration within a set of PUSCH transmission configurations may include at least one of (or one or more of, and/or any combination of) a start and length indicator value (SLIV), a PUSCH mapping type to be applied, and/or a slot offset K2 value. In some embodiments, the PUSCH mapping type may indicate one of slot based scheduling or mini-slot based scheduling. In some embodiments, the UE may indicate a maximum number of PUSCH transmission configurations. In some embodiments, a maximum number of PUSCH transmission configurations may be predefined. In some embodiments, the maximum number of PUSCH transmission configurations may be determined (e.g., via communications between the UE and network) based, at least in part, on a balancing between DCI message (or format) overhead and DCI message (or format) payload size. In some embodiments, the data structure may be defined using abstract syntax notation one (ASN.1) and may include a PUSCH-TimeDomainAllocationlist parameter. In some embodiments, the PUSCH-TimeDomainAllocationlist parameter specifies at least one of (or one or more of, and/or any combination of) a maximum number of PUSCH transmission allocations, a slot offset K2 value, a PUSCH mapping type, and/or a start and length indicator value (SLIV). In some embodiments, the data structure may be simplified to only include a PUSCH mapping type and a length. In some embodiments, the network (and/or network entity/base station) may operate according to 3GPP Fifth Generation New Radio (5G NR) radio access technology (RAT).

At 1104, the UE may receive (from the network) a downlink control information (DCI) message. The DCI message may include a time domain resource assignment field (TDRA) that may indicate (e.g., based on a value of the TDRA) a set of PUSCH transmission configurations included in the data structure. In some embodiments, the indicated set of PUSCH transmission configurations may include a transmission gap between each PUSCH transmission indicated by the set of PUSCH transmission configuration. In some embodiments, the indicated set of PUSCH transmission configurations may not include a transmission gap between each PUSCH transmission indicated by the set of PUSCH transmission configuration.

At 1106, the UE may perform PUSCH transmissions spanning multiple TTIs according to the indicated set of PUSCH transmission configurations over the unlicensed band.

In some embodiments, code block group (CBG) based retransmissions operation for multi-slot/mini-slot PUSCH scheduling may be supported. Such embodiments may improve spectrum efficiency (e.g., usage of the unlicensed band). In some embodiments, a UE may not expect CBG-based retransmissions for a transport block (TB)-based PUSCH scheduled by a multi-slots/mini-slots and/or multi-TTIs PUSCH scheduling DCI format (e.g., as described above). In other words, only TB-based transmission or retransmissions can be scheduled by a multi-slots/mini-slots and/or multi-TTIs PUSCH scheduling DCI message. However, this approach may increase signaling overhead and/or probability of channel unavailability. Thus, to improve resource utilization, in some embodiments, to decrease signaling overhead and/or probability of channel unavailability, multiple (e.g., a set of) CBG transmission information (CBGTI) information elements (IEs) may be transmitted via a DCI message that may schedule multi-slots/sub-slots/mini-slots PUSCH transmissions. In some embodiments, bit numbers of each CBGTI IE (e.g., a number of CBGs per TB for UL transmissions) may be configured by higher layers (e.g., via RRC signaling) on a per UE basis. In some embodiments, the number of CBGs per TB may be based, at least in part, on UE capabilities as well as a balancing (or tradeoff) between control signaling overhead and hybrid automatic repeat request (HARD) operation efficiency. In some embodiments, a DCI format size may linearly increase with a number of PUSCH transmissions scheduled by an UL grant.

Figure 12:
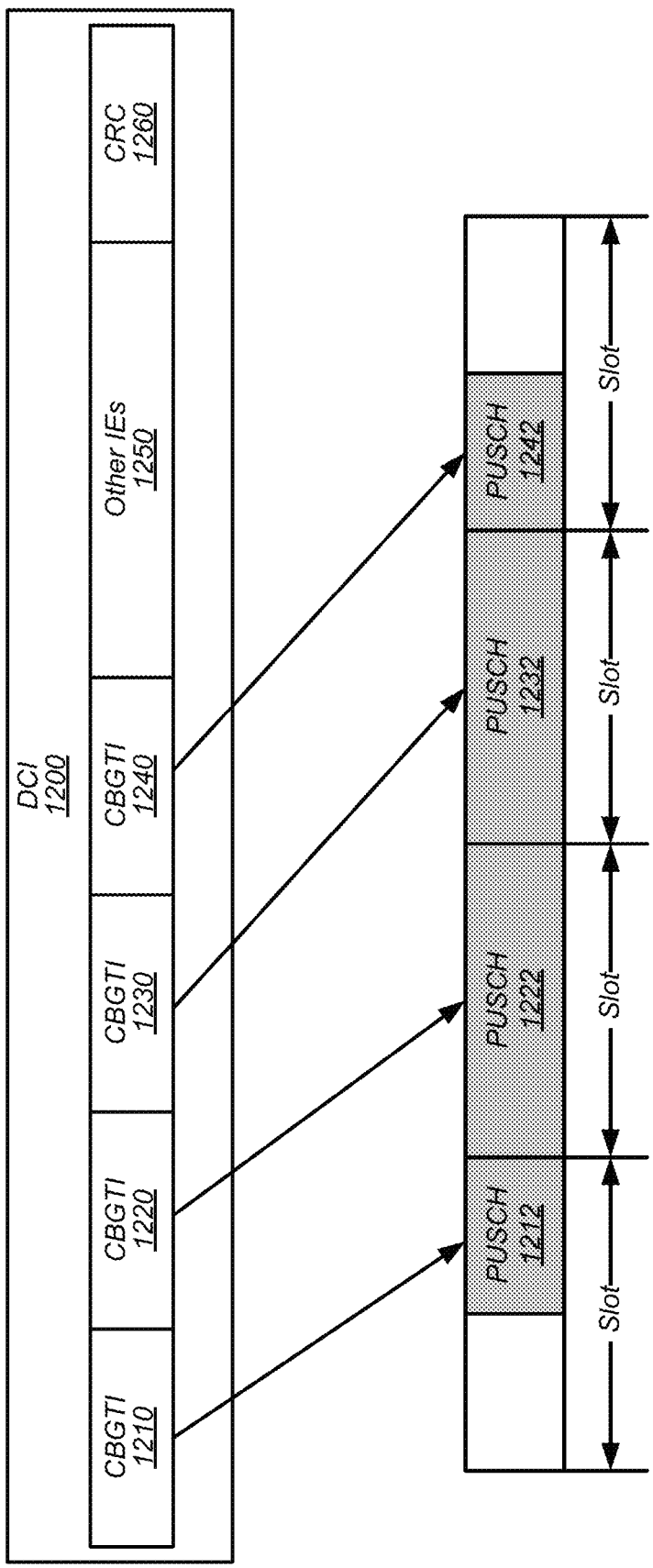
FIG. 12 illustrates an example of CBG-based retransmission for multi-slot/mini-slots PUSCH scheduling, according to some embodiments.

For example, FIG. 12 illustrates an example of CBG-based retransmission for multi-slot/mini-slots PUSCH scheduling, according to some embodiments. As shown, multiple CBG transmission information (CBGTI) IEs 1210 to 1240 may be transmitted to a UE, such as UE 106, via DCI format 1200 (which may also include other IEs 1250 and CRC 1260) to schedule multi-PUSCH transmissions 1212-1242. In some embodiments, bit numbers of each CBGTI IE 1210 to 1240, which may be denoted as $N_{CBG}$ (e.g., a number of CBGs per TB for UL transmissions), may be configured by higher layers on a per UE basis e.g. based on UE geometry and tradeoff between control signaling overhead and HARQ operation efficiency.

In some embodiments, to reduce signaling overhead of multi-TTI UL grants, CBGTI fields may be limited to PUSCH retransmissions only and may not be present for initial PUSCH transmissions. For example, a maximum number of HARQ processes with CBG-based retransmissions (e.g., $N_{CBG,retx}^{max}$) that may be scheduled by a single multi-TTI UL grant may be configured by higher layer signaling (e.g., RRC signaling) on a per UE basis, e.g., to avoid hypothetical blind detection on DCI format sizes at UE side. In some embodiments, HARQ process IDs that are associated with PUSCH retransmission may be implicitly determined by a UE (e.g., based on HARQ-process-specific new data indication (NDI) fields) or signaled in the multi-TTI UL grant as part of the DCI format. For example, a bit map method may be used by CBG-based HARQ process IDs (CBG-HPI) IEs to indicate which HARQ process IDs are retransmitted using CBG-based HARQ retransmission. In some embodiments, CBG-HPI may include a maximum number of bits, $\max\{\lceil \log_2(\text{maxHPICindex})+1 \rceil,1\}$, where maxHPICindex may be a maximum value of $N_{CBG,retx}^{max}$ HARQ process combination indices (HPIC) within PUSCH transmissions scheduled by a single multi-TTI UL grant. In some embodiments, a HPIC combination that uses CBG-based retransmission may be identified by a corresponding HPIC index to an HPIC combination table. In some embodiments, the table may be configured by higher layers (e.g., via RRC signaling) or may be predefined (e.g., by a specification). In some embodiments, when $N_{CBG,retx}^{max}=1$, a HARQ process ID may be directly indicated in a DCI format due to reduced signaling overhead.

In some embodiments, to further reduce signaling overhead associated with CBG-based HARQ operation, a starting slot (or index) and length of CBG-based PUSCH retransmission within a multi-TTI scheduling may be provided to the UE. In some embodiments, the starting PUSCH index, S, with CBG-based operation may be relative to a first PUSCH transmission of the multi-TTI transmissions. Additionally, a number of consecutive PUSCH with CBG-based transmissions, L, counting from the PUSCH index, S, may be indicated. In some embodiments, the indication of the starting PUSCH index, S, and a number of consecutive CBG-based PUSCHs may be separately indicated using dedicated IEs or jointly signaled by a single IE in the multi-TTI DCI format.

Figures 13A, 13B:
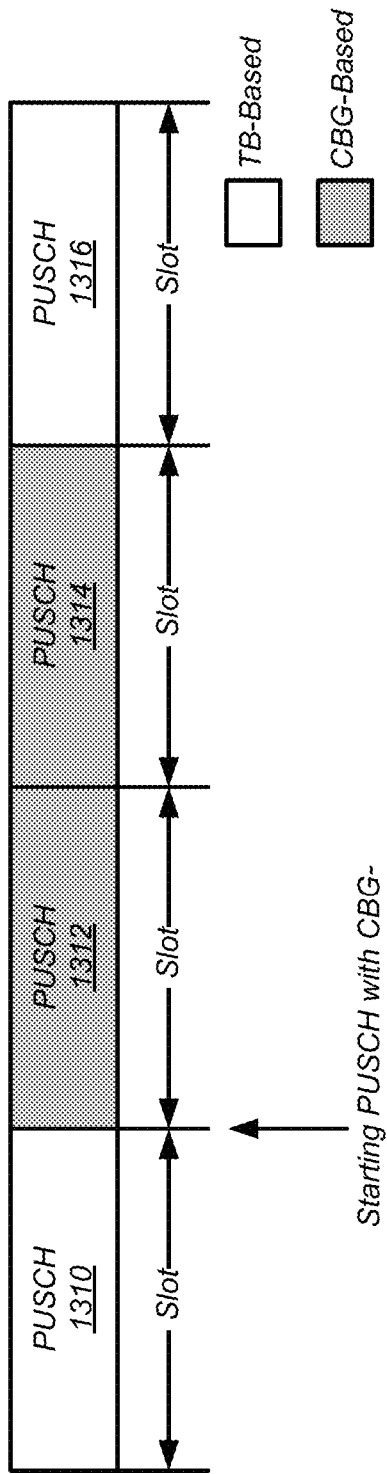
FIGS. 13A-B illustrate examples for starting PUSCH index, S, and corresponding transmissions, according to some embodiments.

For example, FIGS. 13A-B illustrate examples for starting PUSCH index, S, and corresponding transmissions, according to some embodiments. The table shown in FIG. 13B assumes $N_{CBG,retx}^{max}=2$ and that there are 4 PUSCH transmissions scheduled by a single multi-TTI scheduling DCI format. For this example, a total of 3 bits may be sufficient to indicate all combinations of 2 CBG-based PUSCH transmissions, e.g., PUSCH transmissions 1312-1314, which may be proceeded by TB-based PUSCH transmission 1310 and followed by TB-based PUSCH transmission 1316.

In some embodiments, a multi-TTI scheduling DCI format may include information elements (IEs) such as priority class (PC) of PUSCH transmissions and/or LBT type. In some embodiments, a single PC IE in the DCI format may be applied to all PUSCH transmissions to minimize downlink control overhead. In some embodiments, to ensure scheduling flexibility of UL shared channel transmissions with possibly different priority classes, a separate PC IE may be included in the DCI format with a one-to-one association with each PUSCH transmission within a burst of PUSCH transmissions (e.g., at the cost of increased downlink signaling overhead). In some embodiments, 1 bit may be used to signal LBT type, with a value of 0 indicating category-2 (Cat-2) LBT type and a value of 1 indicating a category 4 (Cat-4) LBT type. In some embodiments, joint coding of these IEs (e.g., for priority class and LBT type) may be used to further reduce DCI format sizes.

In some embodiments, aperiodic sounding reference signal (SRS) transmissions may be triggered by a multi-TTI scheduling DCI format. In some embodiments, a UE may transmit the aperiodic SRS transmissions in a triggered SRS resource set in slot flooring defined by $$\left(n \frac{2^{u_{srs}}}{2^{u_{PDCCH}}}\right) + k,$$

where $u_{srs}$ and $u_{PDCCH}$ are a subcarrier spacing configuration for SRS and PDCCH, respectively.

Figure 14:
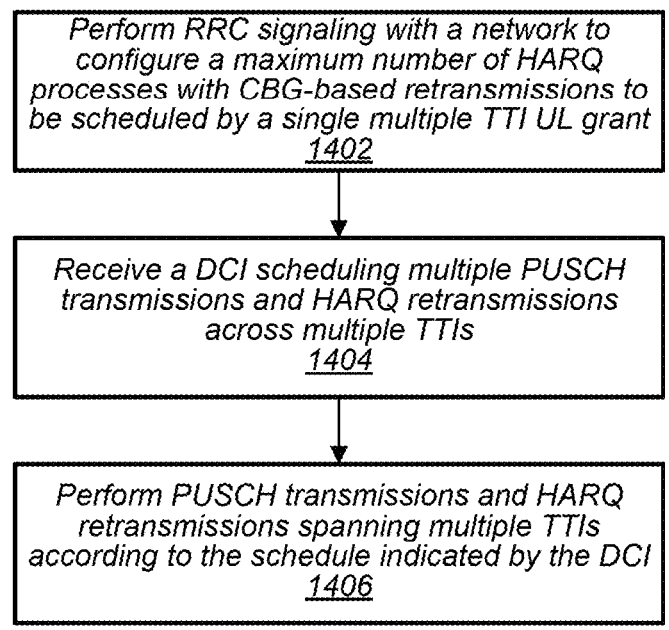
FIG. 14 illustrates a block diagram of an example of a method for code block groups (CBGs) based retransmissions operation for multi-slot/mini-slot PUSCH scheduling, according to some embodiments.

FIG. 14 illustrates a block diagram of an example of a method for code block groups (CBGs) based retransmissions operation for multi-slot/mini-slot PUSCH scheduling, according to some embodiments. The method shown in FIG. 14 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1402, a UE, such as UE 106, may perform radio resource control (RRC) signaling with a network entity, such as gNB 604, to configure a maximum number of hybrid automatic repeat request (HARQ) processes with CBG-based retransmissions to be scheduled by a single multiple transmit time interval (TTI) uplink (UL) grant. In some embodiments, the CBG-based retransmissions may be indicated via one or more CBG transmission information (TI) information elements (IEs).

At 1404, the UE may receive a DCI message that may schedule multiple PUSCH transmissions and HARQ processes with CBG-based retransmissions across multiple TTIs. In some embodiments, HARQ process identifiers associated with PUSCH retransmissions may be implicitly determined by the UE. In some embodiments, HARQ process identifiers associated with PUSCH retransmissions are indicated via the DCI message. In some embodiments, a bit map included in the DCI message may indicate HARQ process identifiers to be retransmitted using GCB-based retransmissions. In some embodiments, a starting transmission slot and length of CBG-based retransmissions may be indicated by the DCI message. In some embodiments, the starting transmission slot may be relative to a first PUSCH transmission of the schedule indicated by the DCI message. In some embodiments, the starting transmission slot and length may be indicated via a single information element included in the DCI message. In some embodiments, the DCI message may indicate a priority class and listen-before-talk (LBT) type. In some embodiments, wherein the priority class and LTB type may be indicated via a single information element included in the DCI message. In some embodiments, aperiodic sounding reference signal (SRS) transmissions may be triggered by the DCI message.

At 1406, the UE may perform PUSCH transmissions and CBG-based HARQ retransmissions spanning multiple TTIs according to the schedule indicated by the DCI message.

Further Embodiments

In some embodiments, a method for scheduling a user equipment device (UE) to transmit over multiple transmit time intervals (TTIs) using an unlicensed band may include a UE (e.g., such as UE 106):

performing radio resource control (RRC) signaling with a network entity to configure a data structure that includes one or more sets of physical uplink shared channel (PUSCH) transmission configurations, wherein each set of PUSCH transmission configurations span a single or multiple TTIs;

receiving, from the network entity, a downlink control information (DCI) message, wherein the DCI message includes a time domain resource assignment field (TDRA), and wherein a value of the TDRA indicates a set of PUSCH transmission configurations included in the data structure; and performing PUSCH transmissions spanning a single or multiple TTIs according to the indicated set of PUSCH transmission configurations over the unlicensed band.

In some embodiments, each set of PUSCH transmission configurations may include one or more PUSCH transmission configurations.

In some embodiments, each PUSCH transmission configuration within a set of PUSCH transmission configurations may include at least one of:

a start and length indicator value (SLIV);

a PUSCH mapping type to be applied; and/or a slot offset K2 value.

In some embodiments, the PUSCH mapping type may indicate one of slot based scheduling or mini-slot based scheduling.

In some embodiments, the method may include the UE indicating a maximum number of PUSCH transmission configurations.

In some embodiments, a maximum number of PUSCH transmission configurations may be predefined.

In some embodiments, the maximum number of PUSCH transmission configurations may be determined based, at least in part, on a balancing between DCI message overhead and DCI message payload size.

In some embodiments, the data structure may be defined using abstract syntax notation one (ASN.1) and includes a PUSCH-TimeDomainAllocationlist parameter. In some embodiments, the PUSCH-TimeDomainAllocationlist parameter may specify at least one of:

a maximum number of PUSCH transmission allocations;

a K2 value;

a PUSCH mapping type; and/or a start and length indicator value (SLIV).

In some embodiments, the data structure may be defined using abstract syntax notation one (ASN.1) and includes a PUSCH mapping type and a length.

In some embodiments, the indicated set of PUSCH transmission configurations may include a transmission gap between each PUSCH transmission indicated by the set of PUSCH transmission configuration.

In some embodiments, the indicated set of PUSCH transmission configurations may not include a transmission gap between each PUSCH transmission indicated by the set of PUSCH transmission configuration.

In some embodiments, the network entity may operate according to 3GPP Fifth Generation New Radio (5G NR) radio access technology (RAT).

In some embodiments, the UE may include:

one or more antennas;

one or more radios, wherein each of the one or more radios is configured to perform cellular communication using at least one radio access technology (RAT); and one or more processors coupled to the one or more radios, wherein the one or more processors and the one or more radios are configured to perform voice and/or data communications, and wherein the one or more processors may be configured to cause the UE to perform the method.

In some embodiments, a non-transitory computer readable memory medium may store program instructions executable by processing circuitry to cause the UE to perform the method.

In some embodiments, a method for scheduling a user equipment device (UE) to transmit over multiple transmit time intervals (TTIs) using an unlicensed band may include a network entity (e.g., such as base station 102):

configuring, via radio resource control (RRC) signaling with the UE, a data structure that includes one or more sets of physical uplink shared channel (PUSCH) transmission configurations, wherein each set of PUSCH transmission configurations span multiple TTIs;

transmitting, to the UE, a downlink control information (DCI) message, wherein the DCI message includes a time domain resource assignment field (TDRA), and wherein a value of the TDRA indicates a set of PUSCH transmission configurations included in the data structure; and receiving, from the UE, PUSCH transmissions spanning multiple TTIs according to the indicated set of PUSCH transmission configurations over the unlicensed band.

In some embodiments, each set of PUSCH transmission configurations may include one or more PUSCH transmission configurations.

In some embodiments, each PUSCH transmission configuration within a set of PUSCH transmission configurations may include at least one of:

a start and length indicator value (SLIV);

a PUSCH mapping type to be applied; and/or a slot offset K2 value.

In some embodiments, the PUSCH mapping type may indicate one of slot based scheduling or mini-slot based scheduling.

In some embodiments, the method may include the network entity receiving, from the UE, an indication of a maximum number of PUSCH transmission configurations.

In some embodiments, a maximum number of PUSCH transmission configurations may be predefined.

In some embodiments, the maximum number of PUSCH transmission configurations may be determined based, at least in part, on a balancing between DCI message overhead and DCI message payload size.

In some embodiments, the data structure may be defined using abstract syntax notation one (ASN.1) and includes a PUSCH-TimeDomainAllocationlist parameter.

In some embodiments, the PUSCH-TimeDomainAllocationlist parameter may specify at least one of:

a maximum number of PUSCH transmission allocations;

a K2 value;

a PUSCH mapping type; and/or a start and length indicator value (SLIV).

In some embodiments, the data structure may be defined using abstract syntax notation one (ASN.1) and includes a PUSCH mapping type and a length.

In some embodiments, the indicated set of PUSCH transmission configurations may include a transmission gap between each PUSCH transmission indicated by the set of PUSCH transmission configuration.

In some embodiments, the indicated set of PUSCH transmission configurations may not include a transmission gap between each PUSCH transmission indicated by the set of PUSCH transmission configuration.

In some embodiments, the network entity may operate according to 3GPP Fifth Generation New Radio (5G NR) radio access technology (RAT).

In some embodiments, the network entity may include:
at least one antenna;
at least one radio, wherein the at least one radio is configured to perform cellular communication using at least one radio access technology (RAT); and
one or more processors coupled to the at least one radio, wherein the one or more processors and the at least one radio are configured to perform voice and/or data communications, and wherein the one or more processors are configured to cause the network entity to perform the method.

In some embodiments, a non-transitory computer readable memory medium may store program instructions executable by processing circuitry to cause the network entity to perform the method.

In some embodiments, a method for code block group (CBG) based retransmissions operation for multi-slot/mini-slot physical uplink control channel (PUSCH) scheduling, may include a user equipment device (UE) (such as UE 106):
performing radio resource control (RRC) signaling with a network entity to configure a maximum number of hybrid automatic repeat request (HARQ) processes with CBG-based retransmissions to be scheduled by a single multiple transmit time interval (TTI) uplink (UL) grant;
receiving, from the network entity, a downlink control information (DCI) message, wherein the DCI message schedules multiple PUSCH transmissions and HARQ processes with CBG-based retransmissions across multiple TTIs; and
performing PUSCH transmissions spanning multiple TTIs according to the schedule indicated by the DCI message.

In some embodiments, the CBG-based retransmissions may be indicated via one or more CBG transmission information (TI) information elements (IEs).

In some embodiments, HARQ process identifiers associated with PUSCH retransmissions may be implicitly determined by the UE.

In some embodiments, HARQ process identifiers associated with PUSCH retransmissions may be indicated via the DCI message.

In some embodiments, a bit map may indicate HARQ process identifiers to be retransmitted using GCB-based retransmissions.

In some embodiments, a starting transmission slot and length of CBG-based retransmissions may be indicated by the DCI message.

In some embodiments, the starting transmission slot may be relative to a first PUSCH transmission of the schedule indicated by the DCI message.

In some embodiments, the starting transmission slot and length may be indicated via a single information element included in the DCI message.

In some embodiments, the DCI message may indicate priority class and listen-before-talk (LBT) type.

In some embodiments, the priority class and LTB type may be indicated via a single information element included in the DCI message.

In some embodiments, aperiodic sounding reference signal (SRS) transmissions may be triggered by the DCI message.

In some embodiments, the UE may include:
one or more antennas;
one or more radios, wherein each of the one or more radios is configured to perform cellular communication using at least one radio access technology (RAT); and
one or more processors coupled to the one or more radios, wherein the one or more processors and the one or more radios are configured to perform voice and/or data communications, and wherein the one or more processors may be configured to cause the UE to perform the method.

In some embodiments, a non-transitory computer readable memory medium may store program instructions executable by processing circuitry to cause the UE to perform the method.

In some embodiments, a method for code block group (CBG) based retransmissions operation for multi-slot/mini-slot physical uplink control channel (PUSCH) scheduling may include a network entity (e.g., such as base station 102):
performing radio resource control (RRC) signaling with a user equipment device (UE) to configure a maximum number of hybrid automatic repeat request (HARQ) processes with CBG-based retransmissions to be scheduled by a single multiple transmit time interval (TTI) uplink (UL) grant;
transmitting, to the UE, a downlink control information (DCI) message, wherein the DCI message schedules multiple PUSCH transmissions and HARQ processes with CBG-based retransmissions across multiple TTIs; and
receiving, from the UE, PUSCH transmissions spanning multiple TTIs according to the schedule indicated by the DCI message.

In some embodiments, the CBG-based retransmissions may be indicated via one or more CBG transmission information (TI) information elements (IEs).

In some embodiments, HARQ process identifiers associated with PUSCH retransmissions may be implicitly determined by the UE.

In some embodiments, HARQ process identifiers associated with PUSCH retransmissions may be indicated via the DCI message.

In some embodiments, a bit map may indicate HARQ process identifiers to be retransmitted using GCB-based retransmissions.

In some embodiments, a starting transmission slot and length of CBG-based retransmissions may be indicated by the DCI message.

In some embodiments, the starting transmission slot may be relative to a first PUSCH transmission of the schedule indicated by the DCI message.

In some embodiments, the starting transmission slot and length may be indicated via a single information element included in the DCI message.

In some embodiments, the DCI message may indicate priority class and listen-before-talk (LBT) type.

In some embodiments, the priority class and LTB type may be indicated via a single information element included in the DCI message.

In some embodiments, aperiodic sounding reference signal (SRS) transmissions may be triggered by the DCI message.

In some embodiments, the network entity may include:
at least one antenna;
at least one radio, wherein the at least one radio is configured to perform cellular communication using at least one radio access technology (RAT); and
one or more processors coupled to the at least one radio, wherein the one or more processors and the at least one radio are configured to perform voice and/or data communications, and wherein the one or more processors are configured to cause the network entity to perform the method.

In some embodiments, a non-transitory computer readable memory medium may store program instructions executable by processing circuitry to cause the network entity to perform the method.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment device (UE), comprising:
one or more antennas;
one or more radios, wherein each of the one or more radios is configured to perform cellular communication using at least one radio access technology (RAT);
one or more processors coupled to the one or more radios, wherein the one or more processors and the one or more radios are configured to perform voice and/or data communications;
wherein the one or more processors are configured to cause the UE to:
receive radio resource control (RRC) signaling from a network entity to identify a data structure that includes one or more sets of physical uplink shared channel (PUSCH) transmission configurations, wherein the data structure is defined using abstract syntax notation one (ASN.1) and includes a time domain allocation list parameter, and wherein the time domain allocation list parameter specifies at least one of a maximum number of PUSCH transmission allocations, a K2 value, a PUSCH mapping type, or a start and length indicator value (SLIV);
receive, from the network entity, a downlink control information (DCI) message, wherein the DCI message includes a time domain resource assignment field (TDRA), new data indicators (NDIs) corresponding to PUSCH transmissions, and a single priority class information field, wherein a value of the TDRA indicates a set of PUSCH transmission configurations included in the data structure; and
perform the PUSCH transmissions spanning a single or multiple slots over an unlicensed band according to the indicated set of PUSCH transmission configurations and a priority class indicated in the priority class information field.

2. The UE of claim 1,
wherein each set of PUSCH transmission configurations includes one or more PUSCH transmission configurations.

3. The UE of claim 1,
wherein each PUSCH transmission configuration within a set of PUSCH transmission configurations includes at least one of:
a start and length indicator value (SLIV);
a PUSCH mapping type to be applied; or
a slot offset K2 value.

4. The UE of claim 3,
wherein the PUSCH mapping type indicates one of slot based scheduling or mini-slot based scheduling.

5. The UE of claim 1,
wherein the one or more processors are configured to cause the UE to:
indicate a maximum number of PUSCH transmission configurations, wherein the maximum number of PUSCH transmission configurations is determined based, at least in part, on a balancing between DCI message overhead and DCI message payload size.

6. The UE of claim 1,
wherein a maximum number of PUSCH transmission configurations are predefined, wherein the maximum number of PUSCH transmission configurations is determined based, at least in part, on a balancing between DCI message overhead and DCI message payload size.

7. The UE of claim 1,
wherein the indicated set of PUSCH transmission configurations includes a transmission gap between each PUSCH transmission indicated by the set of PUSCH transmission configuration.

8. The UE of claim 1,
wherein the indicated set of PUSCH transmission configurations does not include a transmission gap between each PUSCH transmission indicated by the set of PUSCH transmission configuration.

9. The UE of claim 1,
wherein the network entity operates according to 3GPP Fifth Generation New Radio (5G NR) radio access technology (RAT).

10. An apparatus, comprising:
a memory; and
at least one processor in communication with the memory, wherein the at least one processor is configured to:
- receive radio resource control (RRC) signaling from a network entity to configure identify a data structure that includes one or more sets of physical uplink shared channel (PUSCH) transmission configurations, wherein the data structure is defined using abstract syntax notation one (ASN.1) and includes a time domain allocation list parameter, and wherein the time domain allocation list parameter specifies at least one of a maximum number of PUSCH transmission allocations, a K2 value, a PUSCH mapping type, or a start and length indicator value (SLIV);
- receive, from the network entity, a downlink control information (DCI) message, wherein the DCI message includes a time domain resource assignment field (TDRA), new data indicators (NDIs) corresponding to PUSCH transmissions, and a single priority class information field, wherein a value of the TDRA indicates a set of PUSCH transmission configurations included in the data structure; and
- perform the PUSCH transmissions spanning a single or multiple slots over an unlicensed band according to the indicated set of PUSCH transmission configurations and a priority class indicated in the priority class information field.

11. The apparatus of claim 10,
wherein the indicated set of PUSCH transmission configurations includes a transmission gap between each PUSCH transmission indicated by the set of PUSCH transmission configuration.

12. The apparatus of claim 10,
wherein the indicated set of PUSCH transmission configurations does not include a transmission gap between each PUSCH transmission indicated by the set of PUSCH transmission configuration.

13. The apparatus of claim 10,
wherein the network entity operates according to 3GPP Fifth Generation New Radio (5G NR) radio access technology (RAT).

14. The apparatus of claim 10,
wherein each set of PUSCH transmission configurations includes one or more PUSCH transmission configurations.

15. The apparatus of claim 10,
wherein HARQ process identifiers associated with PUSCH retransmissions are indicated via the DCI message, and wherein a bit map indicates HARQ process identifiers to be retransmitted using CBG-based retransmissions, wherein a starting transmission slot and length of CBG-based retransmissions are indicated by the DCI message, wherein the starting transmission slot is relative to a first PUSCH transmission of a schedule indicated by the DCI message, and wherein the starting transmission slot and length are indicated via a single information element included in the DCI message, and wherein the CBG-based retransmissions are indicated via one or more CBG transmission information (TI) information elements (IEs).

16. A non-transitory computer readable memory medium storing program instructions executable by processing circuitry to cause a user equipment device (UE) to:
- receive radio resource control (RRC) signaling from a network entity to identify a data structure that includes one or more sets of physical uplink shared channel (PUSCH) transmission configurations, wherein the data structure is defined using abstract syntax notation one (ASN.1) and includes a time domain allocation list parameter, and wherein the time domain allocation list parameter specifies at least one of a maximum number of PUSCH transmission allocations, a K2 value, a PUSCH mapping type, or a start and length indicator value (SLIV);
- receive, from the network entity, a downlink control information (DCI) message, wherein the DCI message includes a time domain resource assignment field (TDRA), new data indicators (NDIs) corresponding to PUSCH transmissions, and a single priority class information field, and wherein a value of the TDRA indicates a set of PUSCH transmission configurations included in the data structure; and
- perform the PUSCH transmissions spanning a single or multiple slots over an unlicensed band according to the indicated set of PUSCH transmission configurations and a priority class indicated in the priority class information field.

17. The non-transitory computer readable memory of claim 16,
wherein HARQ process identifiers associated with PUSCH retransmissions are implicitly determined by the UE.

18. The non-transitory computer readable memory of claim 16,
wherein HARQ process identifiers associated with PUSCH retransmissions are indicated via the DCI message, and wherein a bit map indicates HARQ process identifiers to be retransmitted using CBG-based retransmissions.

19. The non-transitory computer readable memory of claim 18,
wherein a starting transmission slot and length of CBG-based retransmissions are indicated by the DCI message, wherein the starting transmission slot is relative to a first PUSCH transmission of a schedule indicated by the DCI message, and wherein the starting transmission slot and length are indicated via a single information element included in the DCI message.

20. The non-transitory computer readable memory medium of claim 18,
wherein the CBG-based retransmissions are indicated via one or more CBG transmission information (TI) information elements (IEs).

* * * * *